United States Patent
Jung et al.

(10) Patent No.: US 8,913,332 B2
(45) Date of Patent: Dec. 16, 2014

(54) PHOTOGRAPHING LENS OPTICAL SYSTEM

(75) Inventors: Pil Sun Jung, Seongnam-si (KR); Hyoung Bae Park, Seoul (KR); Chi Ho An, Seongnam-si (KR); Jae Hoon Cho, Seongnam-si (KR); Ji Eun Kim, Seongnam-si (KR)

(73) Assignee: Kolen Co., Ltd. (KR)

( * ) Notice: Subject to any disclaimer, the term of this patent is extended or adjusted under 35 U.S.C. 154(b) by 43 days.

(21) Appl. No.: 13/604,347

(22) Filed: Sep. 5, 2012

(65) Prior Publication Data

US 2014/0063620 A1    Mar. 6, 2014

(51) Int. Cl.
G02B 13/00 (2006.01)
G02B 3/04 (2006.01)

(52) U.S. Cl.
CPC ............ G02B 13/0045 (2013.01); G02B 3/04 (2013.01)
USPC .......................................... 359/764; 359/714

(58) Field of Classification Search
USPC ........ 359/713, 714, 746, 750–753, 763, 764, 359/758; 348/335, 340
See application file for complete search history.

(56) References Cited

U.S. PATENT DOCUMENTS

| 8,179,615 B1* | 5/2012 | Tang et al. ................... 359/714 |
| 2012/0162784 A1* | 6/2012 | Tang et al. ................... 359/714 |

FOREIGN PATENT DOCUMENTS

| JP | 2010197665 A | 9/2010 |
| JP | 2010237407 A | 10/2010 |
| KR | 20100001525 A | 1/2010 |
| KR | 20100043667 A | 4/2010 |

* cited by examiner

*Primary Examiner* — Darryl J Collins
*Assistant Examiner* — Gary O'Neill
(74) *Attorney, Agent, or Firm* — St. Onge Steward Johnston & Reens LLC

(57) ABSTRACT

A lens optical system including first, second, third, fourth, and fifth lenses that are sequentially arranged between an object and an image sensor on which an image of the object is formed. The first lens may have a positive refractive power and may be biconvex. The second lens may have a negative refractive power and may have a meniscus shape that is convex toward the object. The third lens may have a positive refractive power. The fourth lens may have a positive refractive power and may have a meniscus shape that is convex toward the image sensor. The fifth lens may have a negative refractive power, and at least one of an incident surface and an exit surface of the fifth lens may be an aspherical surface.

15 Claims, 8 Drawing Sheets

PHOTOGRAPHING LENS OPTICAL SYSTEM

FIELD OF THE INVENTION

The present invention relates to an optical device, and more particularly, to a lens optical system adopted in a camera.

BACKGROUND OF THE INVENTION

Cameras using a solid state image sensor such as a charge coupled device (CCD) and a complimentary metal oxide semiconductor (CMOS) image sensor are being rapidly distributed.

To increase resolution of a camera, a degree of pixel integration of a solid state image sensor is increased. Also, the size and weight of a camera is being reduced through improvement of performance of a lens optical system included in a camera.

In a general lens optical system of a compact camera, a large number of lenses (for example, 6 to 7 lenses) including at least one glass lens are used in order to secure performance of the lens optical system. However, when a lens optical system includes many lenses, it may be difficult to make the lens optical system compact and light, and the manufacturing costs thereof may also increase. In particular, in case of a glass lens, a manufacturing cost is relatively high and conditions for forming/processing are restricted, so that it may be difficult to make a compact lens optical system.

SUMMARY OF THE INVENTION

The present invention provides a lens optical system that is compact and light and exhibits high performance and high resolution.

According to an aspect of the present invention, there is provided a lens optical system including first, second, third, fourth, and fifth lenses that are sequentially arranged between an object and an image sensor on which an image of the object is formed, wherein the first lens has a positive (+) refractive power and is biconvex, the second lens has a negative (−) refractive power and has a meniscus shape that is convex toward the object, the third lens has a positive (+) refractive power, the fourth lens has a positive (+) refractive power and has a meniscus shape that is convex toward the image sensor, and the fifth lens has a negative (−) refractive power, and at least one of an incident surface and an exit surface of the fifth lens is an aspherical surface.

A focal length f of the lens optical system and a focal length f1 of the first lens may satisfy the following inequality: $0.9 < |f/f1| < 1.5$.

An Abbe number Vd1 of the first lens and an Abbe number Vd2 of the second lens may satisfy the following inequality: $25 < Vd1 - Vd2 < 35$.

An incident surface and an exit surface of the third lens may be convex toward the object at around an optical axis and concave toward the object around an edge portion of the third lens.

The third lens may have a meniscus shape that is convex toward the image sensor.

At least one of the first through fourth lenses may be an aspherical lens.

At least one of an incident surface and an exit surface of at least one of the first through fourth lenses may be an aspherical surface.

At least one of the incident surface and the exit surface of the fifth lens may have a plurality of inflection points.

Each of the incident surface and the exit surface of the fifth lens may have a plurality of inflection points.

The incident surface of the fifth lens may be convex toward the object at a central portion thereof and concave toward the object between the central portion and an edge thereof, and the exit surface of the fifth lens may be concave toward the image sensor at a central portion thereof and convex toward the image sensor between the central portion and an edge thereof.

The incident surface of the fifth lens may have no inflection point, and the exit surface of the fifth lens has a plurality of inflection points.

The incident surface of the fifth lens may be concave toward the object, and the exit surface of the fifth lens is concave toward the image sensor at a central portion thereof and convex toward the image sensor between the central portion and an edge thereof.

The second, third, fourth, and fifth lenses may be aberration correction lenses.

An aperture may be disposed between the object and the first lens.

An aperture may be disposed between the first lens and the second lens.

The lens optical system may further include an infrared ray prevention unit between the object and the image sensor.

The infrared ray prevention unit may be disposed between the fifth lens and the image sensor.

At least one of the first through fifth lenses may be a plastic lens.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
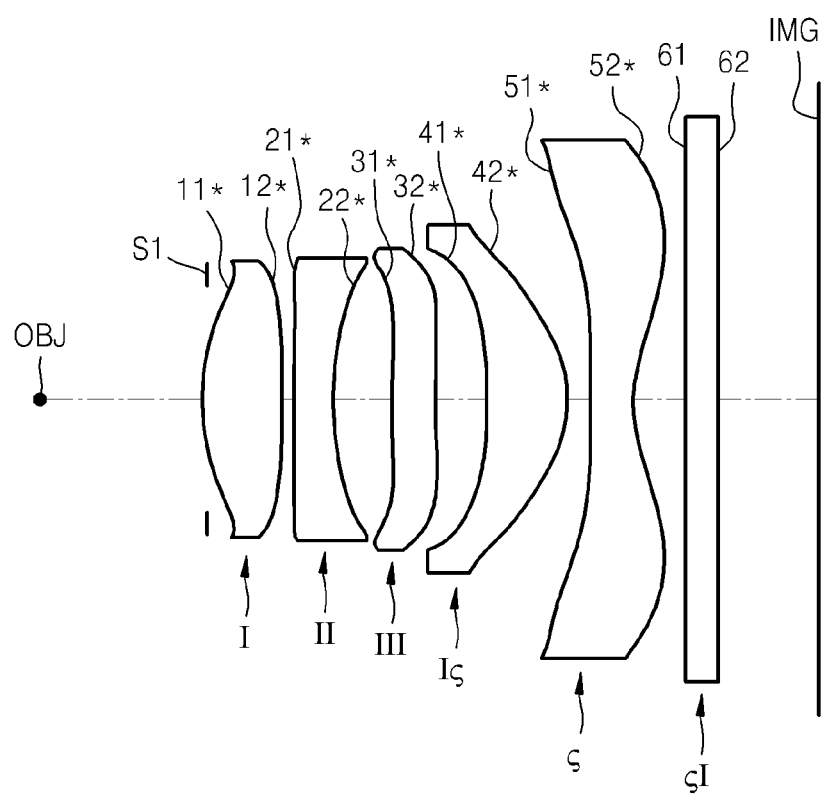
FIGS. 1 through 4 are cross-sectional views illustrating an arrangement of main elements of a lens optical system according to first through fourth embodiments of the present invention, respectively.

Hereinafter, the present invention will be described in detail by explaining exemplary embodiments of the invention with reference to the attached drawings. Like reference numerals in the drawings denote like elements. Expressions such as "at least one of," when preceding a list of elements, modify the entire list of elements and do not modify the individual elements of the list.

FIGS. 1 through 4 are cross-sectional views illustrating an arrangement of main elements of a lens optical system according to first through fourth embodiments of the present invention, respectively.

Figure 2:
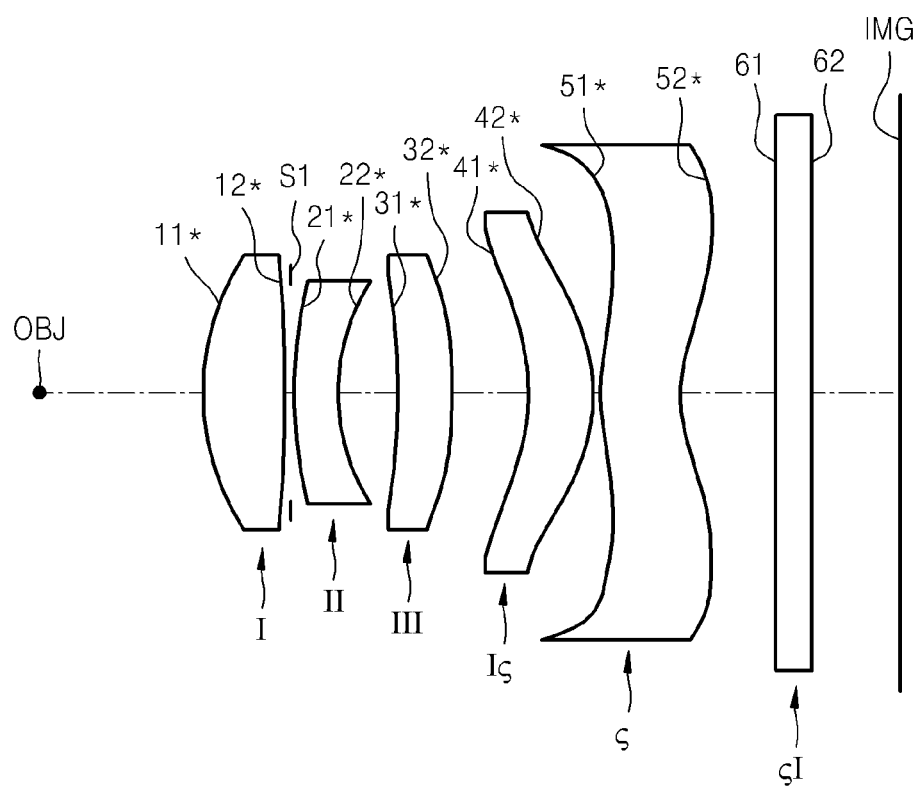
Figure 3:
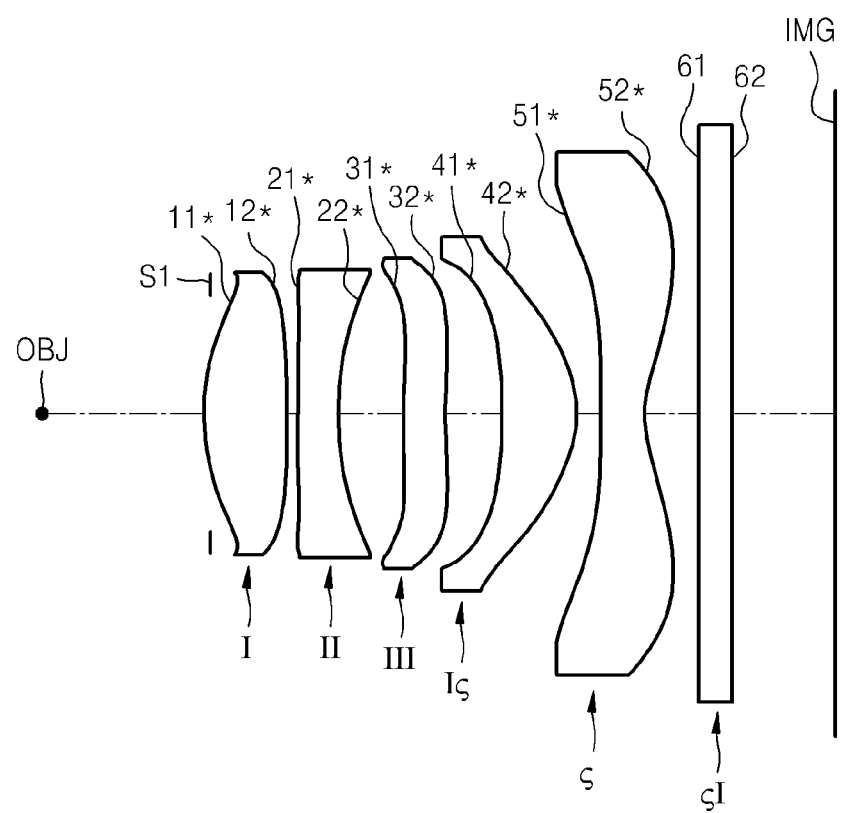
Figure 4:
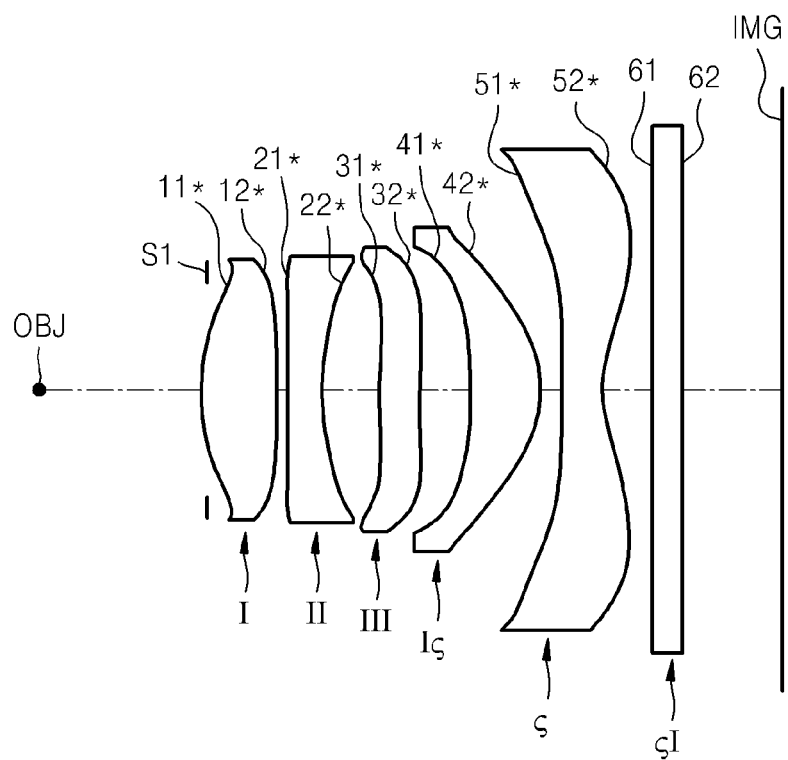

Referring to FIGS. 1 through 4, the lens optical system includes a first lens I, a second lens II, a third lens III, a fourth lens IV, and a fifth lens V that are sequentially arranged between an object OBJ and an image sensor IMG on which an image of the object OBJ is formed, in order from a side of the object OBJ. The first lens I may have a positive (+) refractive power and include an incident surface 11* and an exit surface 12* which are both convex. The second lens II may have a negative (−) refractive power and may be a meniscus lens that is convex toward the object OBJ. The third lens III may have a positive (+) refractive power. In the embodiments of FIGS. 1, 3, and 4, the third lens III is mostly convex toward the image sensor IMG, but may be somewhat convex toward the object OBJ at and around an optical axis. In other words, in FIGS. 1, 3, and 4, an incident surface 31* and an exit surface 32* of the third lens III may be convex toward the object OBJ at around the optical axis (that is, at a central portion of the third lens III) and may be concave toward the object OBJ around an edge portion of the third lens III (i.e., between the central portion and an edge of the third lens III). According to the embodiment of FIG. 2, the third lens III may be a meniscus lens that is convex toward the image sensor IMG. The fourth lens IV may be a meniscus lens that has a positive (+) refractive power and is convex toward the image sensor IMG. At least one of the first through fourth lenses I through IV may be an aspherical lens. That is, at least one of incident surfaces 11*, 21*, 31*, and 41* and exit surfaces 12*, 22*, 32*, and 42* of at least one of the first through fourth lenses I through IV may be aspherical. For example, the incident surfaces 11*, 21*, 31*, and 41* and the exit surfaces 12*, 22*, 32*, and 42* of the first through fourth lenses I through IV may be all aspherical. The fifth lens V may have negative (−) refractive power, and at least one of an incident surface 51* and an exit surface 52* of the fifth lens V may be aspherical. At least one of the incident surface 51* and the exit surface 52* of the fifth lens V may be an aspherical surface having a plurality of inflection points. According to the embodiments of FIGS. 1, 2, and 4, the incident surface 51* and the exit surface 52* of the fifth lens V may each have a plurality of inflection points. In this case, the incident surface 51* of the fifth lens V may be convex toward the object OBJ at a central portion thereof and may be concave toward the object OBJ between the central portion and an edge thereof and the exit surface 52* may be concave toward the image sensor IMG at a central portion thereof and may be convex toward the image sensor IMG between the central portion and an edge thereof. According to the embodiment of FIG. 3, the incident surface 51* of the fifth lens V may have no inflection point and the exit surface 52* of the fifth lens V may have a plurality of inflection points. In this case, the incident surface 51* of the fifth lens V may be concave toward the object OBJ, and the exit surface 52* may be concave toward the image sensor IMG at a central portion thereof and may be convex toward the image sensor IMG between the central portion and an edge thereof. The number of inflection points denotes the number of inflection points on a curve corresponding to the incident surface 51* of each fifth lens V of FIGS. 1 through 4 (hereinafter referred to as a first curve) and on a curve corresponding to the exit surface 52* of each fifth lens V of FIGS. 1 through 4 (hereinafter referred to as a second curve). At least one of the first curve and the second curve may have a plurality of inflection points. The first lens I may have a high positive (+) refractive power, and the second through fifth lenses II, III, IV, and V may function as aberration correction lenses.

The lens optical system may further include an aperture S1 and an infrared ray prevention unit VI. In FIGS. 1, 3 and 4, the aperture S1 may be disposed at a side of the first lens I facing the object OBJ. That is, the stop S1 may be provided between the object OBJ and the first lens I. Alternatively, as illustrated in FIG. 2, the aperture S1 may be provided between the first lens I and the second lens II. As illustrated in FIGS. 1 through 4, the infrared ray prevention unit VI may be disposed between the fifth lens V and the image sensor IMG. The infrared ray prevention unit VI may be an infrared ray prevention filter. The positions of the aperture S1 and the infrared ray prevention unit VI are exemplary, and may be changed.

The lens optical system having the above configuration according to the embodiments of the present invention may preferably satisfy at least one of Inequalities 1 and 2 below.

$$0.9<|f/f1|<1.5,\qquad \text{<Inequality 1>}$$

In equality 1, f denotes a focal length of the whole lens optical system, and f1 denotes a focal length of the first lens I.

Inequality 1 expresses conditions for reducing spherical aberrations. Also, Inequality 1 is related to making the lens optical system compact. When |f/f1| of Inequality 1 is equal to or less than a lower limit of 0.9, it may be advantageous to make a lens optical system compact, but spherical aberration may increase. In contrast, when |f/f1| is equal to or greater than an upper limit of 1.5, it may be advantageous to correct spherical aberration, but the overall length of the lens optical system is increased and thus it may be difficult to make the lens optical system compact. When the conditions of Inequality 1 are satisfied, spherical aberration may be maintained in a good state, and a compact lens optical system may be obtained.

$$25<Vd1-Vd2<35\qquad \text{<Inequality 2>}$$

In Inequality 2, Vd1 denotes an Abbe number of the first lens I, and Vd2 denotes an Abbe number of the second lens II. The Abbe numbers Vd1 and Vd2 are measured using a d-line.

In Inequality 2, the Abbe number Vd1 of the first lens I and the Abbe number Vd2 of the second lens II are related to materials of the first and second lenses I and II, and Inequality 2 expresses conditions for reducing chromatic aberration of the lens optical system. If Inequality 2 is satisfied, correction effects of axial chromatic aberration and chromatic difference of magnification may be obtained.

In addition, when an image formation surface is a CCD or a CMOS image sensor, angles of rays toward peripheral portions of an image surface may increase, but if the exit surface 52* of the fifth lens V is formed as an aspherical surface having a plurality of inflection points as in the embodiments of the present invention, a maximum exit angle of chief rays may be reduced to about 25° or less. Accordingly, spherical aberration, coma aberration, and astigmatism may be easily corrected, and moreover, distortion may also be easily corrected.

In the above-described embodiments of the present invention, the values of Inequalities 1 and 2 are as shown in Tables 1 and 2 below. In Table 1, the focal lengths f and f1 are expressed in units of millimeters (mm).

TABLE 1

| Classification | f | f1 | Inequality 1 (0.9 < |f/f1| < 1.5) |
|---|---|---|---|
| 1st Embodiment | 4.800 | 3.414 | 1.406 |
| 2nd Embodiment | 4.800 | 3.346 | 1.434 |
| 3rd Embodiment | 4.890 | 3.414 | 1.432 |
| 4th Embodiment | 4.840 | 3.413 | 1.418 |

TABLE 2

| Classification | Vd1 | Vd2 | Inequality 2 (25 < Vd1 − Vd2 < 35) |
|---|---|---|---|
| 1st Embodiment | 55.85 | 23.40 | 32.45 |
| 2nd Embodiment | 55.85 | 23.89 | 31.96 |
| 3rd Embodiment | 55.85 | 23.40 | 32.45 |
| 4th Embodiment | 55.85 | 23.40 | 32.45 |

Referring to Tables 1 and 2, it can be seen that the lens optical systems of the first to fourth embodiments satisfy Inequalities 1 and 2.

In the lens optical systems according to the above-described embodiments, the first through fifth lenses I, II, III, IV, and V may be manufactured of plastic in consideration of the shape and dimension thereof. That is, the first through fifth lenses I, II, III, IV, and V may be all plastic lenses. For a glass lens, a manufacturing cost is high and conditions for forming/processing are restricted, so that it may be difficult to make the lens optical system compact. However, in the embodiments of the present invention, since the first through fifth lenses I, II, III, IV, and V may be all manufactured of plastic, a variety of advantages may be obtained. Nevertheless, in the present invention, the material of the first through fifth lenses I, II, III, IV, and V is not limited to plastic. If necessary, at least one of the first through fifth lenses I, II, III, IV, and V may be manufactured of glass.

The lens optical systems according to the first through fourth embodiments of the present invention will be described in detail with reference to lens data and the accompanying drawings.

Tables 3 through 6 respectively show curvature radiuses, lens thicknesses or distances between lenses, refractive indexes, and the Abbe numbers of lenses constituting the lens optical system of FIGS. 1 through 4. In Tables 3 through 6, "R" denotes a curvature radius, "D" denotes a lens thickness or a distance between lenses or neighboring constituent elements, "Nd" denotes a refractive index of a lens measured by using a d-line, and "Vd" denotes the Abbe number of a lens with respect to the d-line. In numbers of the surfaces of the lenses in Tables 3 through 6, the mark * denotes that a corresponding lens surface is an aspherical surface. The unit of R and D is millimeters (mm).

TABLE 3

| 1st Embodiment | Surface | R | D | Nd | Vd |
|---|---|---|---|---|---|
| | S1 | — | — | | |
| I | 11* | 2.126 | 0.756 | 1.531 | 55.85 |
| | 12* | −11.127 | 0.111 | | |
| II | 21* | 24.692 | 0.370 | 1.632 | 23.40 |
| | 22* | 2.935 | 0.552 | | |
| III | 31* | 7.971 | 0.409 | 1.531 | 55.85 |
| | 32* | 8.296 | 0.487 | | |
| IV | 41* | −4.639 | 0.753 | 1.531 | 55.85 |
| | 42* | −0.983 | 0.212 | | |
| V | 51* | 30.348 | 0.400 | 1.531 | 55.85 |
| | 52* | 1.085 | 0.500 | | |
| VI | 61 | | 0.300 | 1.516 | 64.10 |
| | 62 | | 0.967 | | |
| | IMG | Infinity | | | |

TABLE 4

| 2nd Embodiment | Surface | R | D | Nd | Vd |
|---|---|---|---|---|---|
| I | 11* | 2.123 | 0.691 | 1.531 | 55.85 |
| | 12* | −10.000 | 0.045 | | |
| | S1 | — | 0.030 | | |
| II | 21* | 3.311 | 0.367 | 1.635 | 23.89 |
| | 22* | 1.474 | 0.500 | | |
| III | 31* | −19.471 | 0.460 | 1.531 | 55.85 |
| | 32* | −5.005 | 0.648 | | |
| IV | 41* | −1.640 | 0.549 | 1.531 | 55.85 |
| | 42* | −1.390 | 0.030 | | |
| V | 51* | 1.888 | 0.680 | 1.531 | 55.85 |
| | 52* | 1.239 | 0.800 | | |
| VI | 61 | | 0.300 | 1.523 | 39.07 |
| | 62 | | 0.750 | | |
| | IMG | Infinity | | | |

TABLE 5

| 3rd Embodiment | Surface | R | D | Nd | Vd |
|---|---|---|---|---|---|
| | S1 | — | — | | |
| I | 11* | 2.125 | 0.763 | 1.531 | 55.85 |
| | 12* | −11.137 | 0.100 | | |
| II | 21* | 24.744 | 0.372 | 1.632 | 23.40 |
| | 22* | 2.997 | 0.598 | | |
| III | 31* | 7.697 | 0.388 | 1.531 | 55.85 |
| | 32* | 7.585 | 0.523 | | |
| IV | 41* | −4.630 | 0.680 | 1.531 | 55.85 |
| | 42* | −0.988 | 0.223 | | |
| V | 51* | −23.610 | 0.403 | 1.531 | 55.85 |
| | 52* | 1.187 | 0.500 | | |
| VI | 61 | | 0.300 | 1.516 | 64.10 |
| | 62 | | 0.965 | | |
| | IMG | Infinity | | | |

TABLE 6

| 4th Embodiment | Surface | R | D | Nd | Vd |
|---|---|---|---|---|---|
| | S1 | — | — | | |
| I | 11* | 2.124 | 0.756 | 1.531 | 55.85 |
| | 12* | −11.148 | 0.101 | | |
| II | 21* | 24.676 | 0.354 | 1.632 | 23.40 |
| | 22* | 2.948 | 0.573 | | |
| III | 31* | 8.519 | 0.399 | 1.531 | 55.85 |
| | 32* | 8.482 | 0.509 | | |
| IV | 41* | −4.630 | 0.694 | 1.531 | 55.85 |
| | 42* | −0.996 | 0.214 | | |
| V | 51* | 28.255 | 0.400 | 1.531 | 55.85 |
| | 52* | 1.110 | 0.500 | | |
| VI | 61 | | 0.300 | 1.516 | 64.10 |
| | 62 | | 1.019 | | |
| | IMG | Infinity | | | |

The aperture ratio (Fno) and focal length (f) of each lens optical system according to the first through fourth embodiments of the present invention respectively corresponding to FIGS. 1 through 4 are shown in Table 7.

TABLE 7

| Classification | Aperture ratio (Fno) | Focal length (f) [mm] |
|---|---|---|
| 1st Embodiment | 2.24 | 4.800 |
| 2nd Embodiment | 2.40 | 4.800 |
| 3rd Embodiment | 2.26 | 4.890 |
| 4th Embodiment | 2.25 | 4.840 |

Also, the aspherical surface of each lens of the lens optical systems according to the first through fourth embodiments of the present invention satisfy the following aspherical surface equation, that is, Equation 3.

$$x = \frac{c'y^2}{1+\sqrt{1-(K+1)c'^2y^2}} + Ay^4 + By^6 + Cy^8 + Dy^{10} + Ey^{12} \quad \langle\text{Equation 3}\rangle$$

In Equation 3, "x" denotes a distance from the apex of a lens in a direction along an optical axis, "y" denotes a distance in a direction perpendicular to the optical axis, "c" denotes a reciprocal number (=1/r) of a curvature radius at the apex of a lens, "K" denotes a conic constant, and "A, B, C, D, and E" each denotes an aspherical surface coefficient.

Tables 8 through 11 show aspherical surface coefficients of aspherical surfaces of the respective lens optical systems according to the first through fourth embodiments corresponding to FIGS. 1 through 4. That is, Tables 8 through 11 show aspherical surface coefficients of incident surfaces 11*, 21*, 31*, 41*, and 51* and exit surfaces 12*, 22*, 32*, 42*, and 52* of the respective lenses of Tables 3 through 6.

TABLE 8

| Surface | K | A | B | C | D | E |
|---|---|---|---|---|---|---|
| 11* | −0.1313 | −0.0027 | −0.0067 | 0.0033 | −0.0064 | −1.12E−03 |
| 12* | −222.1859 | −0.0091 | −0.0181 | −0.0060 | −0.0012 | 8.32E−04 |
| 21* | 315.3271 | −0.0024 | −0.0206 | 0.0026 | 0.0010 | 2.38E−04 |
| 22* | 0.7932 | −0.0209 | 0.0046 | 0.0043 | −0.0060 | 3.09E−03 |
| 31* | −182.2138 | −0.0442 | −0.0200 | −0.0024 | −0.0006 | −2.69E−04 |
| 32* | −236.0263 | −0.0408 | −0.0101 | −0.0052 | −0.0011 | −4.79E−04 |
| 41* | 8.9926 | −0.0385 | 0.0144 | −0.0008 | −0.0044 | 9.26E−04 |
| 42* | −3.7591 | −0.0815 | 0.0252 | −0.0040 | −0.0001 | 8.28E−05 |
| 51* | −9000.0000 | −0.0483 | 0.0063 | 0.0001 | 0.0000 | −4.79E−07 |
| 52* | −7.0120 | −0.0470 | 0.0085 | −0.0012 | 0.0000 | 4.51E−06 |

TABLE 9

| Surface | K | A | B | C | D | E |
|---|---|---|---|---|---|---|
| 11* | −0.2038 | 0.0028 | −0.0014 | 0.0034 | −0.0042 | −3.24E−03 |
| 12* | 11.3369 | 0.0362 | −0.0004 | −0.0334 | 0.0253 | 1.34E−02 |
| 21* | −20.3276 | 0.0114 | 0.0219 | −0.0569 | 0.0703 | −5.93E−02 |
| 22* | −1.8802 | −0.0553 | 0.0912 | −0.0449 | −0.0048 | 1.56E−02 |
| 31* | −36.3167 | −0.0654 | −0.0090 | 0.0093 | 0.0060 | 3.76E−03 |
| 32* | 10.8305 | −0.0395 | −0.0161 | 0.0103 | 0.0033 | 1.96E−03 |
| 41* | −12.7783 | −0.0791 | 0.0568 | −0.0539 | 0.0396 | −1.04E−02 |
| 42* | −1.0646 | 0.0725 | −0.0485 | 0.0286 | −0.0096 | 3.84E−03 |
| 51* | −12.1620 | −0.0861 | 0.0221 | −0.0020 | −0.0002 | −4.88E−05 |
| 52* | −5.8905 | −0.0686 | 0.0204 | −0.0052 | 0.0008 | −5.31E−05 |

TABLE 10

| Surface | K | A | B | C | D | E |
|---|---|---|---|---|---|---|
| 11* | −0.1273 | −0.0029 | −0.0063 | 0.0035 | −0.0063 | −1.10E−03 |
| 12* | −222.5854 | −0.0088 | −0.0178 | −0.0058 | −0.0012 | 8.97E−04 |
| 21* | 311.1817 | −0.0030 | −0.0210 | 0.0024 | 0.0009 | 1.88E−04 |
| 22* | 0.7482 | −0.0208 | 0.0040 | 0.0040 | −0.0062 | 3.04E−03 |
| 31* | −167.6279 | −0.0446 | −0.0196 | −0.0023 | −0.0007 | −3.47E−04 |
| 32* | −182.5412 | −0.0407 | −0.0107 | −0.0050 | −0.0010 | −4.20E−04 |
| 41* | 8.8655 | −0.0393 | 0.0139 | −0.0003 | −0.0041 | 9.92E−04 |
| 42* | −3.7992 | −0.0827 | 0.0261 | −0.0037 | 0.0000 | 8.68E−05 |
| 51* | −2291.7480 | −0.0484 | 0.0063 | 0.0001 | 0.0000 | −2.39E−07 |
| 52* | −7.7372 | −0.0477 | 0.0085 | −0.0012 | 0.0000 | 4.46E−06 |

TABLE 11

| Surface | K | A | B | C | D | E |
|---|---|---|---|---|---|---|
| 11* | −0.1225 | −0.0028 | −0.0071 | 0.0035 | −0.0061 | −1.03E−03 |
| 12* | −223.2367 | −0.0084 | −0.0180 | −0.0059 | −0.0011 | 7.75E−04 |
| 21* | 314.9253 | −0.0016 | −0.0202 | 0.0026 | 0.0009 | 2.00E−04 |
| 22* | 0.8430 | −0.0203 | 0.0046 | 0.0040 | −0.0059 | 3.13E−03 |
| 31* | −184.5398 | −0.0479 | −0.0196 | −0.0025 | −0.0009 | −3.96E−04 |
| 32* | −213.2969 | −0.0412 | −0.0110 | −0.0052 | −0.0009 | −4.27E−04 |
| 41* | 8.9017 | −0.0335 | 0.0132 | −0.0011 | −0.0043 | 9.73E−04 |
| 42* | −3.7519 | −0.0813 | 0.0256 | −0.0044 | −0.0002 | 7.89E−05 |
| 51* | −8369.7909 | −0.0511 | 0.0063 | 0.0002 | 0.0000 | −1.11E−06 |
| 52* | −7.1748 | −0.0493 | 0.0090 | −0.0013 | 0.0000 | 5.24E−06 |

Figure 5:
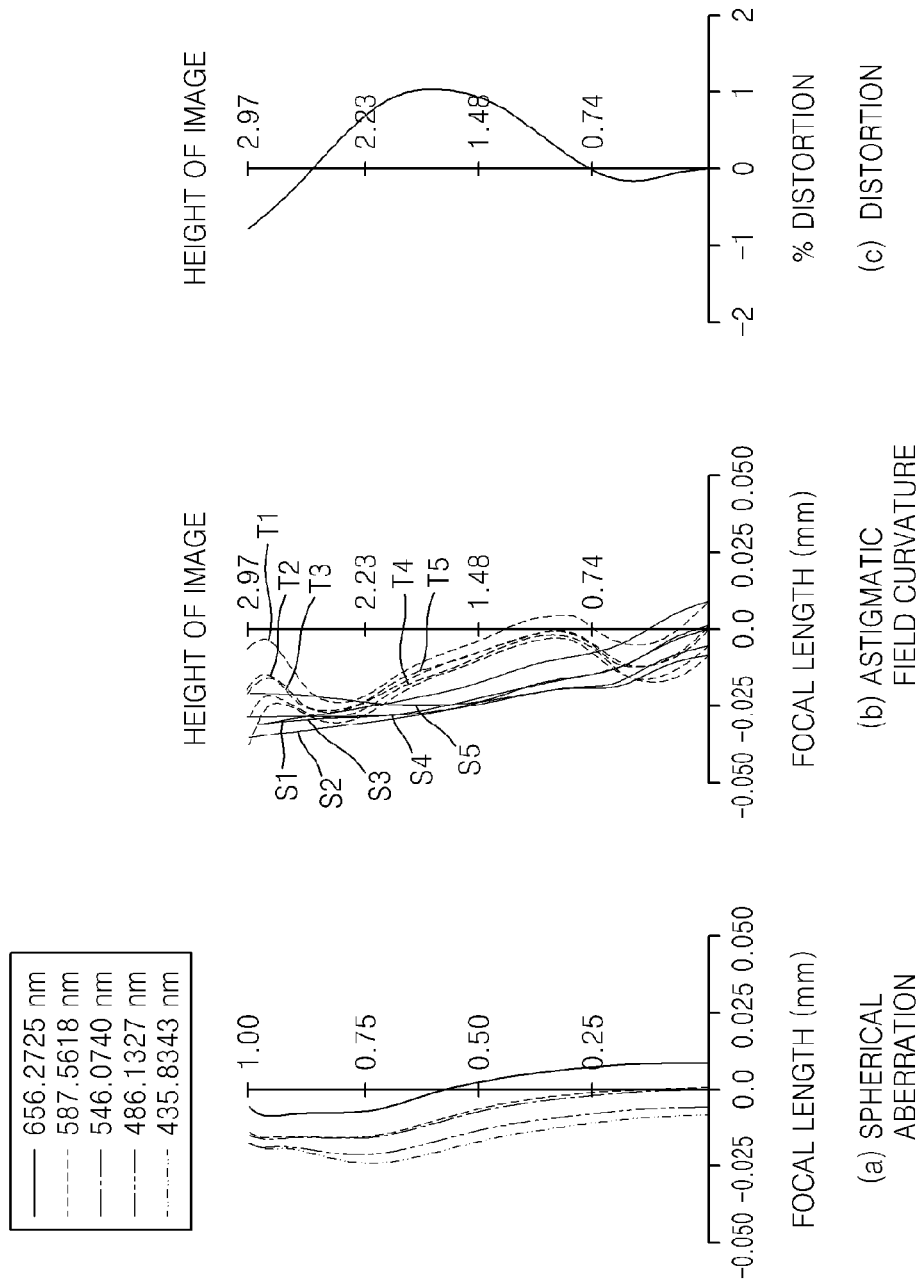
FIG. 5 shows aberration diagrams illustrating longitudinal spherical aberration, astigmatic field curvature, and distortion of the lens optical system according to the first embodiment of the present invention.

FIG. 5 shows aberration diagrams illustrating longitudinal spherical aberration, astigmatic field curvature, and distortion of the lens optical system according to the first embodiment of the present invention shown in FIG. 1, that is, the lens optical system having data of Table 3.

In FIG. 5, an aberration diagram (a) illustrates longitudinal spherical aberration of a lens optical system with respect to light of various wavelengths. An aberration diagram (b) illustrates an astigmatic field curvature of a lens optical system, that is, tangential field curvatures T1 through T5 and sagittal field curvatures S1 through S5. The wavelengths of light used to obtain data of the aberration diagram (a) are 656.2725 nm, 587.5618 nm, 546.0740 nm, 486.1327 nm, and 435.8343 nm. The wavelength of light used to obtain T1 and S1 of data of the aberration diagram (b) is 656.2725 nm, and the wavelength used to obtain T2 and S2 is 587.5618 nm, and the wavelength used to obtain T3 and S3 is 546.0740 nm, and the wavelength used to obtain T4 and S4 is 486.1327 nm, and the wavelength used to obtain T5 and S5 is 435.8343 nm. The wavelength used to obtain data of aberration diagram (c) is 546.0740 nm. The same wavelengths are used in FIGS. 6 through 8.

Figure 6:
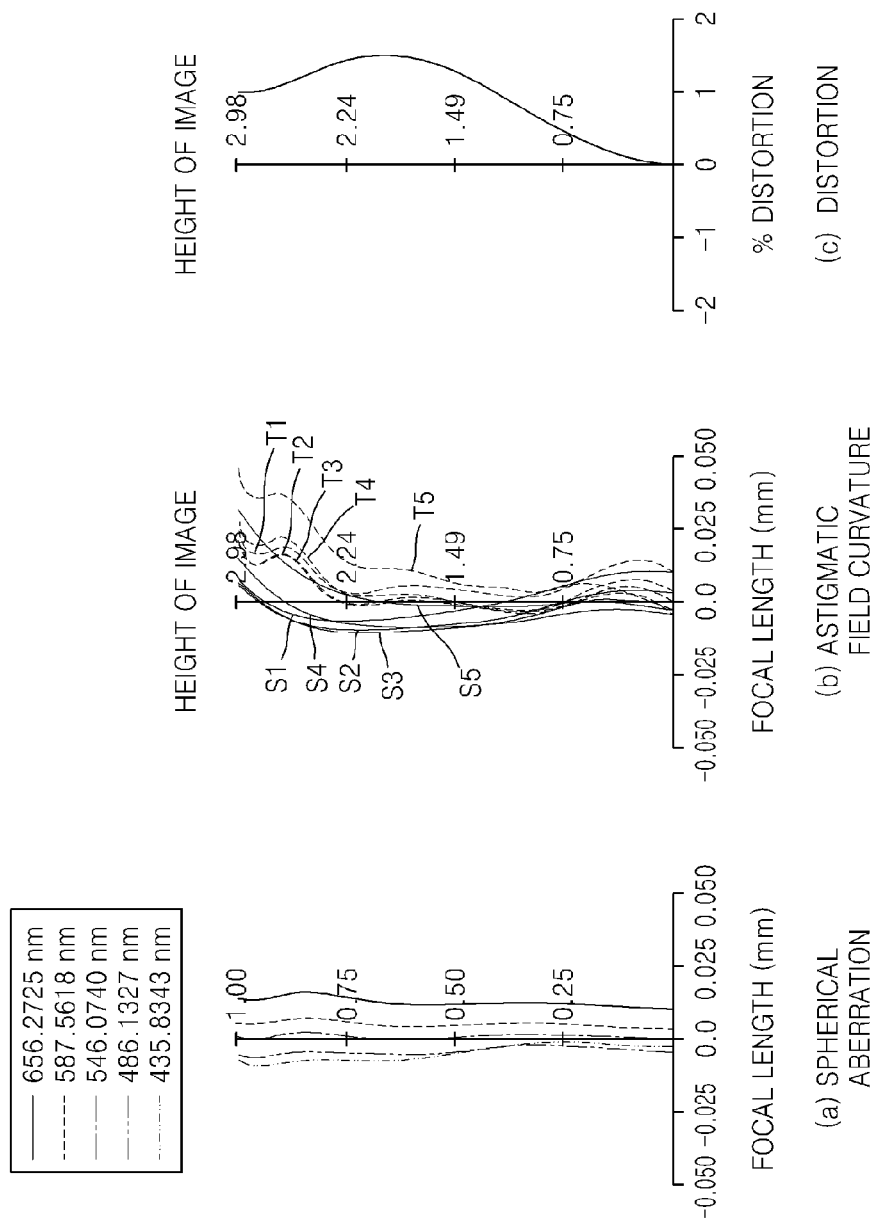
FIG. 6 shows aberration diagrams illustrating longitudinal spherical aberration, astigmatic field curvature, and distortion of the lens optical system according to the second embodiment of the present invention.

Aberration diagrams (a), (b), and (c) of FIG. 6 respectively illustrate longitudinal spherical aberration, astigmatic field curvature, and distortion of the lens optical system according to the second embodiment of the present invention shown in FIG. 2, that is, the lens optical system having data of Table 4.

Figure 7:
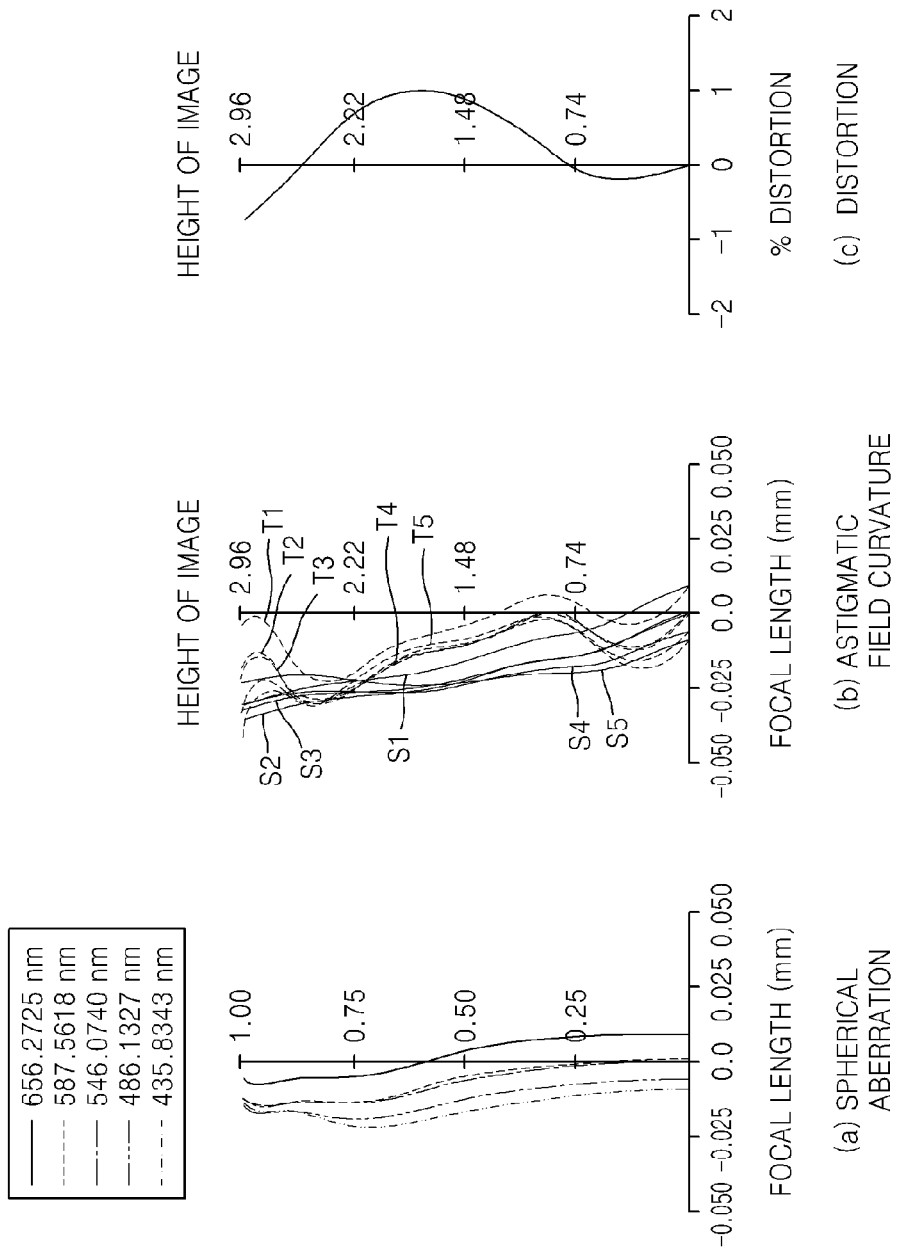
FIG. 7 shows aberration diagrams illustrating longitudinal spherical aberration, astigmatic field curvature, and distortion of the lens optical system according to the third embodiment of the present invention.

Aberration diagrams (a), (b), and (c) of FIG. 7 respectively illustrate longitudinal spherical aberration, astigmatic field curvature, and distortion of the lens optical system according to the third embodiment of the present invention shown in FIG. 3, that is, the lens optical system having data of Table 5.

Figure 8:
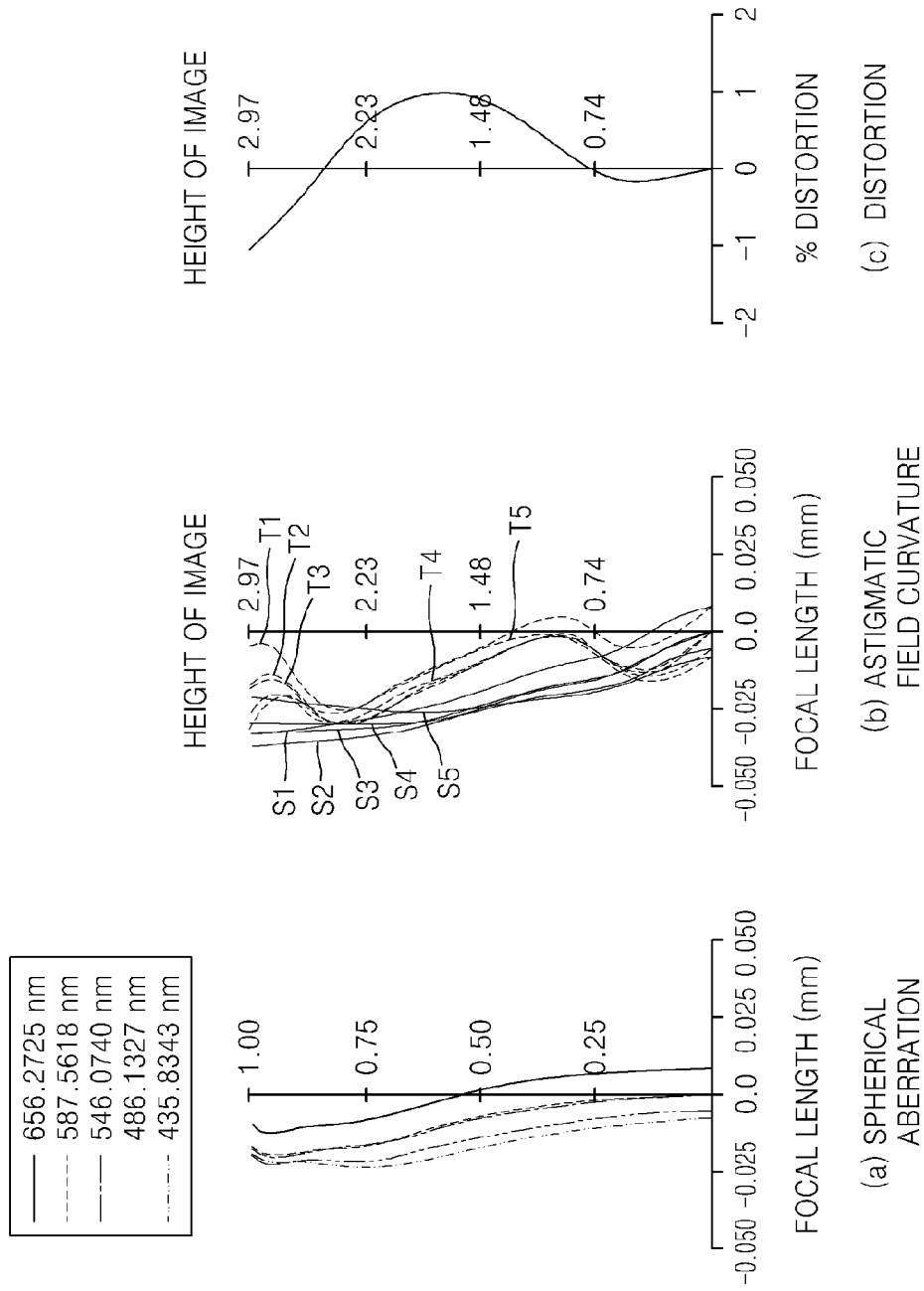
FIG. 8 shows aberration diagrams illustrating longitudinal spherical aberration, astigmatic field curvature, and distortion of the lens optical system according to the fourth embodiment of the present invention.

Aberration diagrams (a), (b), and (c) of FIG. 8 respectively illustrate longitudinal spherical aberration, astigmatic field curvature, and distortion of the lens optical system according to the fourth embodiment of the present invention shown in FIG. 4, that is, the lens optical system having data of Table 6.

As described above, the lens optical system according to the present invention includes the first through fifth lenses I, II, III, IV, and V respectively having positive (+), negative (−), positive (+), positive (+), and negative (−) refractive powers and sequentially arranged in a direction from the object OBJ to the image sensor IMG, and may satisfy at least one of Inequalities 1 and 2. The lens optical system may easily (well) correct various aberrations and have a relatively short total length. Thus, according to the present invention, a lens optical system having a compact size and also exhibiting high performance and a high resolution may be embodied.

In particular, when at least one of the incident surface 51* and the exit surface 52* of the fifth lens V of the lens optical system is aspherical and has a plurality of inflection points, various aberrations may be easily corrected using the fifth lens V, and by decreasing an exit angle of a chief ray, vignetting may also be prevented.

Also, as described above, since the first through fifth lenses I, II, III, IV, and V may be formed of plastic and at least one of two surfaces, that is, an incident surface and an exit surface, of each lens may be formed as an aspherical surface, a lens optical system that is compact and has superior performance may be embodied at low cost compared to a case of using a glass lens.

While this invention has been particularly shown and described with reference to exemplary embodiments thereof, it will be understood by those skilled in the art that various changes in form and details may be made therein without departing from the spirit and scope of the invention as defined by the appended claims. For example, a shield film (blocking film) may be used instead of a filter as the infrared ray prevention unit VI. In addition, other various modifications may be possible. Therefore, the scope of the invention is defined not by the detailed description of the invention but by the appended claims.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A lens optical system comprising first, second, third, fourth, and fifth lenses that are sequentially arranged between an object and an image sensor on which an image of the object is formed, wherein
    the first lens has a positive (+) refractive power and is biconvex,
    the second lens has a negative (−) refractive power and has a meniscus shape that is convex toward the object,
    the third lens has a positive (+) refractive power,
    the fourth lens has a positive (+) refractive power and has a meniscus shape that is convex toward the image sensor, and
    the fifth lens has a negative (−) refractive power, and at least one of an incident surface and an exit surface of the fifth lens is an aspherical surface,
    wherein the incident surface of the fifth lens has no inflection point, and the exit surface of the fifth lens has a plurality of inflection points,
    wherein the incident surface of the fifth lens is concave toward the object at a center portion thereof and around the center portion, and
    wherein the entire region of an incident surface of the second lens is convex toward the object,
    wherein a focal length f of the lens optical system is greater than or equal to 4.8 mm and smaller than or equal to 4.89 mm,
    wherein a focal length f1 of the first lens is greater than or equal to 3.346 mm and smaller than or equal to 3.414 mm, and
    wherein the focal length f of the lens optical system and the focal length f1 of the first lens satisfy the following inequality:

$1.42 < |f/f1| < 1.5$.

2. The lens optical system of claim 1, wherein an Abbe number Vd1 of the first lens and an Abbe number Vd2 of the second lens satisfy the following inequality:

$25 < Vd1 - Vd2 < 35$.

3. The lens optical system of claim 1, wherein an incident surface and an exit surface of the third lens are convex toward the object at around an optical axis and concave toward the object around an edge portion of the third lens.

4. The lens optical system of claim 1, wherein the third lens has a meniscus shape that is convex toward the image sensor.

5. The lens optical system of claim 1, wherein at least one of the first through fourth lenses is an aspherical lens.

6. The lens optical system of claim 1, wherein at least one of an incident surface and an exit surface of at least one of the first through fourth lenses is an aspherical surface.

7. The lens optical system of claim 1, wherein at least one of the incident surface and the exit surface of the fifth lens has a plurality of inflection points.

8. The lens optical system of claim 1, wherein the incident surface of the fifth lens is concave toward the object, and
    the exit surface of the fifth lens is concave toward the image sensor at a central portion thereof and convex toward the image sensor between the central portion and an edge thereof.

9. The lens optical system of claim 1, wherein the second, third, fourth, and fifth lenses are aberration correction lenses.

10. The lens optical system of claim 1, wherein an aperture is disposed between the object and the first lens.

11. The lens optical system of claim 1, wherein an aperture is disposed between the first lens and the second lens.

12. The lens optical system of claim 1, further comprising an infrared ray prevention unit between the object and the image sensor.

13. The lens optical system of claim 12, wherein the infrared ray prevention unit is disposed between the fifth lens and the image sensor.

14. The lens optical system of claim 1, wherein at least one of the first through fifth lenses is a plastic lens.

15. A lens optical system comprising first, second, third, fourth, and fifth lenses that are sequentially arranged between an object and an image sensor on which an image of the object is formed, wherein
    the first lens has a positive (+) refractive power and is biconvex,
    the second lens has a negative (−) refractive power and has a meniscus shape that is convex toward the object,
    the third lens has a positive (+) refractive power,
    the fourth lens has a positive (+) refractive power and has a meniscus shape that is convex toward the image sensor, and
    the fifth lens has a negative (−) refractive power, and at least one of an incident surface and an exit surface of the fifth lens is an aspherical surface,
    wherein the entire region of an incident surface of the second lens is convex toward the object, and each of an incident surface and an exit surface of the third lens is convex toward the object at around an optical axis and concave toward the object around an edge portion of the third lens,
    wherein a focal length f of the lens optical system is greater than or equal to 4.8 mm and smaller than or equal to 4.89 mm
    wherein the focal length f of the lens optical system and the focal length f1 of the first lens satisfy the following inequality:

$1.4 < |f/f1| < 1.5$.

* * * * *